United States Patent
Senda et al.

(10) Patent No.: US 6,542,174 B2
(45) Date of Patent: Apr. 1, 2003

(54) MAP DISPLAYING SYSTEM AND MAP DISPLAYING METHOD

(75) Inventors: Keiichi Senda, Hyogo-ken (JP); Shigeo Asahara, Osaka-fu (JP); Kenji Nishimura, Mie-ken (JP); Hitoshi Araki, Kyoto-fu (JP); Masato Yuda, Osaka-fu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 240 days.

(21) Appl. No.: 09/729,423

(22) Filed: Dec. 5, 2000

(65) Prior Publication Data

US 2001/0005810 A1 Jun. 28, 2001

(30) Foreign Application Priority Data

Dec. 20, 1999 (JP) ............................................. 11-360885
Dec. 9, 1999 (JP) ............................................. 11-350154

(51) Int. Cl.$^7$ ............................................. G06T 15/00
(52) U.S. Cl. ..................... 345/848; 345/440; 345/771; 345/855
(58) Field of Search ..................... 342/357.13; 340/195; 701/208; 345/419, 629, 630, 440, 581, 606, 607, 610, 619, 473, 474, 475, 712, 764, 771, 772, 848, 849, 850, 851, 853, 854, 855

(56) References Cited

U.S. PATENT DOCUMENTS 6,157,342 A  * 12/2000 Okude et al. .......... 345/357.13

FOREIGN PATENT DOCUMENTS

| JP | 7-220055 | 8/1995 |
| JP | 10-207356 | 8/1998 |
| JP | 11-161159 | 6/1999 |

* cited by examiner

Primary Examiner—Almis R. Jankus
(74) Attorney, Agent, or Firm—McDermott, Will & Emery

(57) ABSTRACT

This invention relates to map displaying system, in which the reference altitude value determining means obtains a reference altitude value in accordance with the altitude data in the specific area, and the altitude data changing means performs the processing that each altitude both in the plane area and the solid area have the continuity from one area to another. And the 2-dimensional road data storage means stores the 2-dimensional ground road data and the 2-dimensional underground road data separately. Therefore, the 3-dimensional road data preparing means prepares the 3-dimensional ground road data in accordance with the 2-dimensioanl ground road data and the altitude data, while preparing the 3-dimensional underground road data in accordance with the 2-dimensional underground road data and the altitude data.

26 Claims, 16 Drawing Sheets

BOUNDARY LINE: α
A: PLANE AREA
B: SOLID AREA
C: BOUNDARY AREA BETWEEN PLANE AREA AND SOLID AREA (a)
(b)
A: PLANE AREA
B: SOLID AREA (a)

C: ROUND PLANE AREA
R: RECTANGULAR AREA
SOLID AREA (b)

C: ROUND PLANE AREA
R: RECTANGULAR AREA
SOLID AREA

☐ INTERPOLATED POINT
■ EXISTENT ROAD COMPONENT POINT

MESH LANDFORM

ALTITUDE DIFFERENCE

3-D BIRD-EYE VIEW

B

2-D BIRD-EYE VIEW

DISPLAYING SCREEN

ROAD

A

■ ROAD COMPONENT POINT

MAP DISPLAYING SYSTEM AND MAP DISPLAYING METHOD

FIELD OF THE INVENTION

This invention relates to a map displaying system for displaying map-data on a monitor, like a navigation system and so on.

BACKGROUND OF THE INVENITON

The navigation system is a system for detecting a user's standing position by GPS (Global Positioning System) or Self-supporting System, and displaying the standing position together with the surrounding map data on a monitor.

In the navigation system, the displaying method of map data has been improved variously because there is a necessity of comprehending instinctively the situation far way from the standing position. For instance, in the navigation system disclosed in Japanese Patent Laid-open Publication No. 7-220055, as a user is going away from the standing position, the map data is displayed scaling down, and a bird-eye view (a map described looking down on a landscape from the heights) is applied to such displayed map data, said bird-eye view prepared by the conversion processing of perspective projection described later.

The above navigation system, however, adopts 2-dimensional map data, so that the displayed map could be always a 2-dimensional bird-eye view. Accordingly, there was a problem that the user is hard to comprehend the standing position, as the displayed map does not agree with the actual landscape in case of undulating land.

Therefore, in the navigation system disclosed in Japanese Patent Laid-open Publication No. 10-207356, by making a use of 3-dimensional map data the distant place is displayed on a monitor as a 3-dimensional bird-eye view. The configuration will be described below according to FIG. 13.

The 2-dimensional map data storage means 1 stores map data comprising position information and attribute information regarding roads, facilities, town blocks, landmark, and location name. The position information is represented by 2-dimensional coordinates corresponding to the latitude and the longitude.

The landform data storage means 2 stores altitude data of crossing points of the latitude and the longitude per specific degree (distance). That is to say, as shown in FIG. 14, each point represented by a white circle is equivalent to a crossing point of the latitude and the longitude located at a specific distance (degree). The black circles acquired by adding an altitude value to the crossing points are connected with each other, thereby a polyhedron (which is called "mesh-landform" hereinafter) is formed. The polyhedron is represented as the undulating conditions of the actual ground surface, that is, the landform (which will be described later).

When the standing position detecting means (the GPS, and so on) that is not shown in the drawings detects a user's standing position, the 2-dimensional bird-eye view preparing means 3 and the 3-dimensional bird-eye view preparing means 4 are activated and perform the conversion processing of the perspective projection shown in FIG. 15.

In other words, the 2-dimensional bird-eye view preparing means 3 specifies the area (which is called "plane area" hereunder) to be displayed on the monitor as the 2-dimensional bird-eye view at first (in this step, the area to be displayed at the lower side of the monitor is specified), and fetches the map data corresponding to the plane area from the 2-dimensional map data storage means 1. The map data thus fetched out is processed by the converting of the perspective projection, thereby the 2-dimensional bird-eye view data can be prepared.

On the other hand, the 3-dimensional map data preparing means 23 specifies the area (which is called "solid area" hereunder) to be displayed on the monitor as the 3-dimensional bird-eye view at first (in this step, the area to be displayed at the upper side of the monitor is specified), and fetches the map data corresponding to the solid area from the 2-dimensional map data storage means 1 while fetching the altitude data in the solid area from the landform data storage means 2. After preparing the 3-dimensional map data as shown in FIG. 16 in accordance with the map data and the altitude data fetched out as above, the 3-dimensional bird-eye view preparing means 4 prepares the 3-dimensional bird-eye view data by the conversion processing of the perspective projection on the display coordinate system.

After the 2-dimensional bird-eye view data and the 3-dimensional bird-eye view data are prepared as above, the display means 5 displays the 2-dimensional bird-eye view data at the lower side of the monitor and the 3-dimensional bird-eye view data at the upper side of the monitor (see FIG. 17).

In the above description, the 2-dimensional map data is handled as one data including roads, facilities and etc., but when the road data should be main like a car-navigator, it is configured that road information are displayed being overlapped on the map information displayed as above.

Specifically, the 2-dimensional road data storage means 21 (which may be included in the 2-dimensional map data storage means) stores various information regarding roads as the 2-dimensional road data. The 2-dimensional road data comprises "point number information" for specifying each point composing a road (which is called "road component point" hereafter), "latitude and longitude information" for expressing the latitude and the longitude at which the road component point is located by the corresponding 2-dimensional coordinates (x-coordinate, y-coordinate), "road type information" for indicating the type of the road such as ROUTE X, "connection information" for expressing the road component points to be connected by the above-mentioned point number, and so on. And as shown in FIG. 18(*a*), a Point 2(x, y)=(100, −100), said point composing ROUTE 16 by being connected with a Point 3, may be represented by the 2-dimensional road data, such as (2, 100, −100, ROUTE 16, 3) [point number information, x-coordinate, y-coordinate, road number, point number information of the next connected point].

Here, providing that the map information should be converted to the 3-dimensional bird-eye view as described above, the problem is how to overlap the landform data with the road information.

As shown in FIG. 13, the 3-dimensional road data preparing means 22 first specifies an area to be displayed based on the standing position, and the 2-dimensional road data corresponding to the displayed area is fetched out from the 2-dimensional road data storage means 21 while the landform data corresponding to the displayed area is fetched out from the landform data storage means 2. Moreover the 3-dimensional road data is prepared based on the 2-dimensional road data and the altitude data fetched out as above. The converting of the perspective projection is performed on the 3-dimensional road data.

Thereby, the ground surface image data and the 3-dimensional road image data are prepared. Such data are combined to the bird-eye view by the 3-dimensional bird-eye view preparing means 4, and then handed to the display means 5.

As a result, the monitor can display the image combining the ground surface image data and the 3-dimensional road image data even the solid data.

The navigation system disclosed in Japanese Patent Laid-open Publication No. 10-207356, however, is configured to prepare the 2-dimensional bird-eye view data based on only the 2-dimensional map data (which is not based on the altitude data). That is to say, although the actual altitude value is adopted as an altitude value of the solid area B, since 0 is used as the altitude value of the plane area, accordingly it causes a problem; the sudden altitude difference appears in the boundary between the 2-dimensional bird-eye view and the 3-dimensional bird-eye view, as shown in FIG. 17.

And in the conventional navigation system, it is configured that the 3-dimensional road data is prepared only by connecting the road component points one after another with a straight line. Therefore, when there are the road component points dispersed from one mesh to another as shown in FIG. 19, it is not possible to display the ground road along the undulation of mesh-landform. This problem appears remarkably on the part of the straight line on which the density of road component points is lower than that of the changeful part such as a curve.

And moreover, since it is defined that the road component points exist on the surface of the earth in the above conventional navigation system, even the underground road such as a tunnel must be described on the surface of the earth, otherwise the underground road is not described at all. Therefore, such configuration is not convenient for the user.

SUMMARY OF THE INVENTION

The present invention is suggested based on the above conventional problems, and has an object to provide a map displaying system that can display continuously both the 2-dimensional bird-eye view and the 3-dimensional bird-eye view, and also display the ground road along the undulation of the mesh-landform, moreover display not only the ground road but also the underground road.

To achieve the object, the invention adopts the following means. Specifically, the invention presupposes the map displaying system, as shown in FIG. 1, for displaying a 2-dimensional bird-eye view acquired by the perspective processing of map data in a plane area represented by 2-dimensional coordinates, and for displaying a 3-dimensional bird-eye view acquired by the perspective processing of 3-dimensional map data in a solid area made by adding altitude values to plural points of map data represented by the 2-dimensional coordinates.

And the reference altitude value determining means 6 determines as a reference altitude value the altitude data in each specified area, such as, the mean value of the altitude data in the plane area, the mean value of the altitude data in the boundary area between the plane area and the solid area, and so on.

According to the reference altitude data, the altitude data changing means 7 changes the altitude difference between the plane area and the solid area B to relative height of a user's sight. In other words, the altitude data changing means 7 changes the altitude data in the solid area B into the value made by subtracting the reference altitude value from the true altitude data, and when the changed value gets negative, the negative value is handled as 0.

According to the prescribed procedure, it is possible to display the 2-dimensional bird-eye view and the 3-dimensional bird-eye view continuously (see FIG. 4).

Moreover, without using the reference altitude value as described above, the following processing can be adopted. That is to say, it is configured as shown in FIG. 7 that altitude data changing means may interpolate a gap formed in the boundary between the plane area and the solid area and may bring the continuity to the plane area and the solid area. In this case, the altitude data changing means makes an altitude vale compulsively equal to either an altitude value in the boundary of the plane area side or one in the boundary of the solid area side, said both side boundaries forming the gap, and smoothes those altitude values so as to diminish the moving volume form the original altitude value along with going away from the boundary.

And a method of displaying a 3-dimensional road in the map displaying system is as follow.

3-dimensional road data preparing means may interpolate by adding an altitude to specific points on respective straight line connecting road component points. Thereby the road information composed by the road component points can match the landform data composed by altitude data and a specific rectangular such as the latitude and longitude.

In case of displaying the underground road data, 2-dimensional road data storage means stores 2-dimensional ground road data and 2-dimensional underground road data separately; and 3-dimensional underground road data preparing means prepares 3-dimensional ground road data based on the 2-dimensional ground road data and the altitude data, and prepares 3-dimensional underground road data based on the 2-dimensional underground road data and the altitude data.

In this case, the 3-dimensional underground road data preparing means calculates the altitude value of the road component points located under the ground in accordance with a straight line connecting a start point and an end point, if both the start point and the end point of the underground road are known. And on the other hand, the 3-dimensional underground road data preparing means calculates the altitude value of the road component points located under the ground in accordance with the altitude value on the ground corresponding to the road component point, if either the start point or the end point of the underground road is known.

Therefore, it is possible to display on a monitor not only the 3-dimensional ground road but also the 3-dimensional underground; the invention can provide a user with a map displaying system useful by far.

DETAILED DESCRIPTION OF THE INVENTION

[Embodiment 1]

Figure 1:
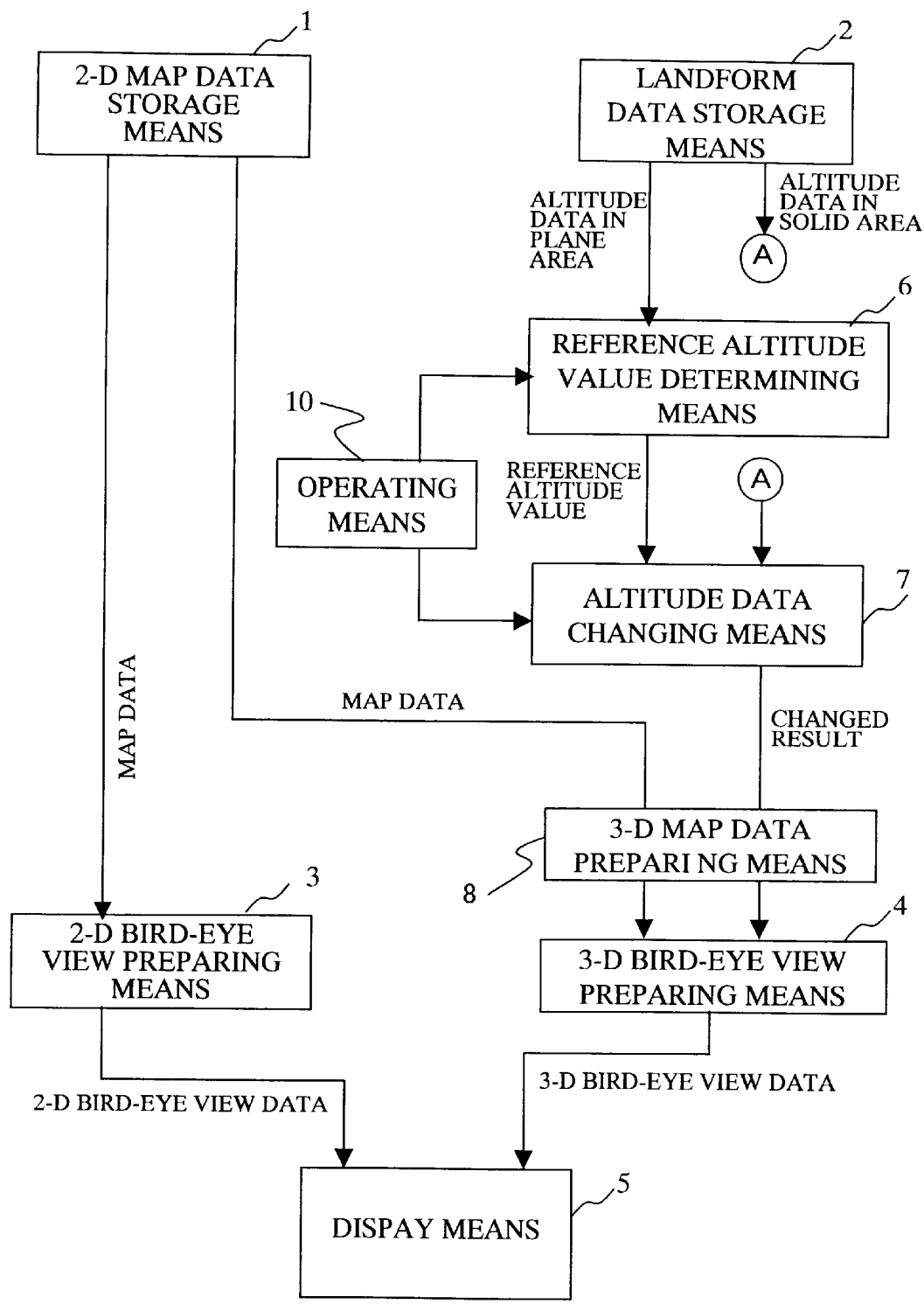
FIG. 1 is a functional block diagram showing the navigation system to which the present invention is applied.

The preferred embodiment of the invention will be described in details hereafter referring to the drawings.

FIG. 1 is a functional block diagram of the navigation system to which the invention is applied, and the constitution will be described below regarding the difference points from the conventional system only Specifically, the content that the map data storage means 1 and the landform data storage means 2 have stored and the procedure of preparing the 2-dimensional bird-eye view are the same as the conventional system, which explanation will be omitted here, but the procedure of preparing the 3-dimensional bird-eye view will be explained here.

Figure 2:
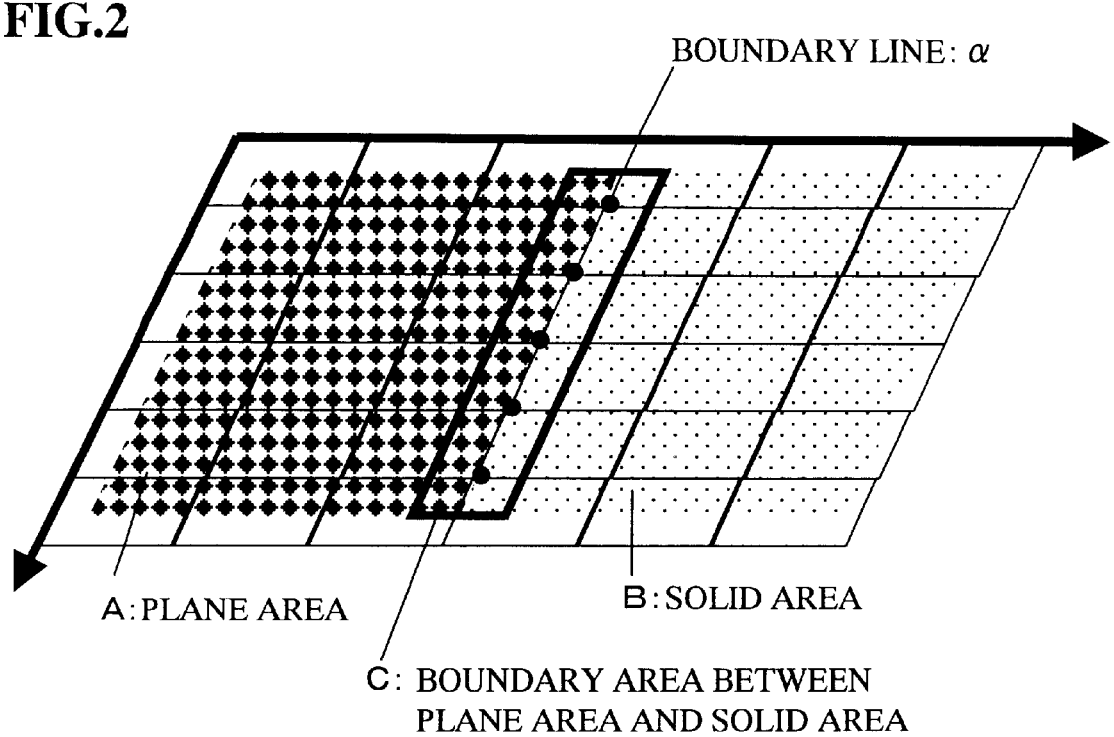
FIG. 2 is an explanatory diagram of the boundary area.

First, after fetching the altitude data in the plane area A shown in FIG. 2 from the landform data storage means 2, the reference altitude value determining means 6 calculates the mean value of the altitude data in the plane area and then gives the mean value of the reference altitude value to the altitude data changing means 7.

And then, after fetching the altitude data in the solid area B from the landform storage means 2, the altitude data changing means 7 changes all attitude vales in the plane area A into 0 while performing the calculation of subtracting the given reference altitude value from the altitude value in the solid area B. Thereby, all altitude values in the solid area become low for the reference altitude value.

Next, of the altitude data as the calculated results, only the altitude data contiguous to the plane area (which will be described later) are changed to "0", and the changed results are handed to the 3-dimensional map data preparing means 8. For instance, when the altitude data "103", "102", "104", and "98" belong to the solid area B, the altitude data "103" and "102" are contiguous to the plane area. When the reference altitude value is "100", the altitude data changing means 7 changes the altitude data "103" into "0", the altitude data "102" to "0", the altitude data "104" into "4", and the altitude data "98" into "–2", of which results are given to the 3-dimensional map data preparing means 8.

The altitude data of points represented by the black circles on the boundary line α shown in FIG. 2 are defined as the altitude data contiguous to the plane area.

The sequential steps are the same as the conventional system except the step of using the above changed results as the altitude data in the solid area B. That is to say, the 3-dimensional map data preparing means 8 fetches the 2-dimensional map data in the solid area B from the 2-dimentioanl map data storage means 1, and prepares the 3-dimensional map based on the 2-dimensional map data and the altitude data of the changed results, and then the 3-dimensional bird-eye view preparing means 4 performed the converting of the perspective projection to the display coordinate system from the 3-dimensional map. Thereby the 3-dimensional bird-eye view data are prepared.

Figure 3:
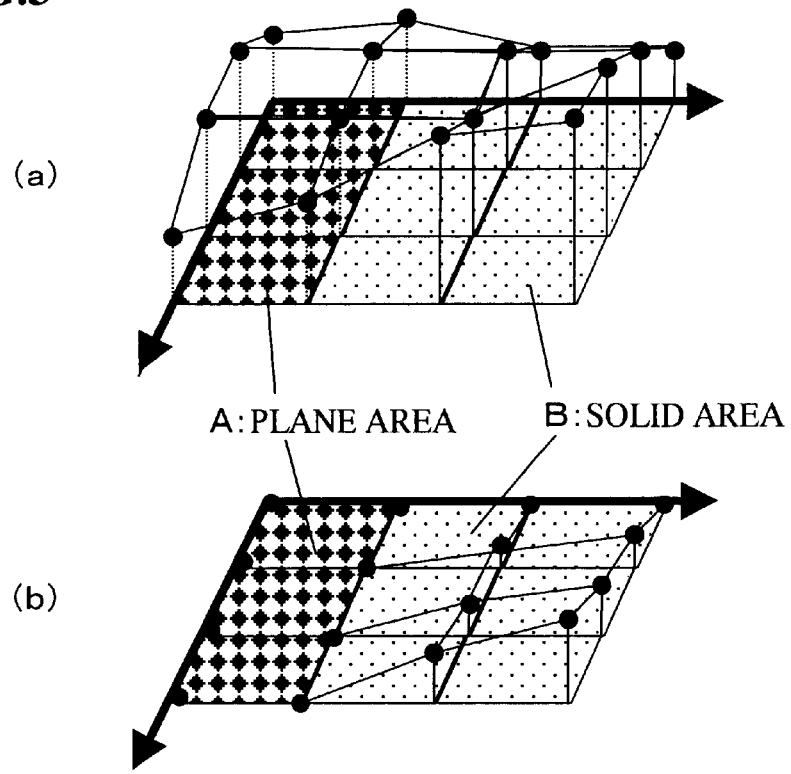
FIG. 3 is a diagram showing the transition of the mesh landform.
Figure 4:
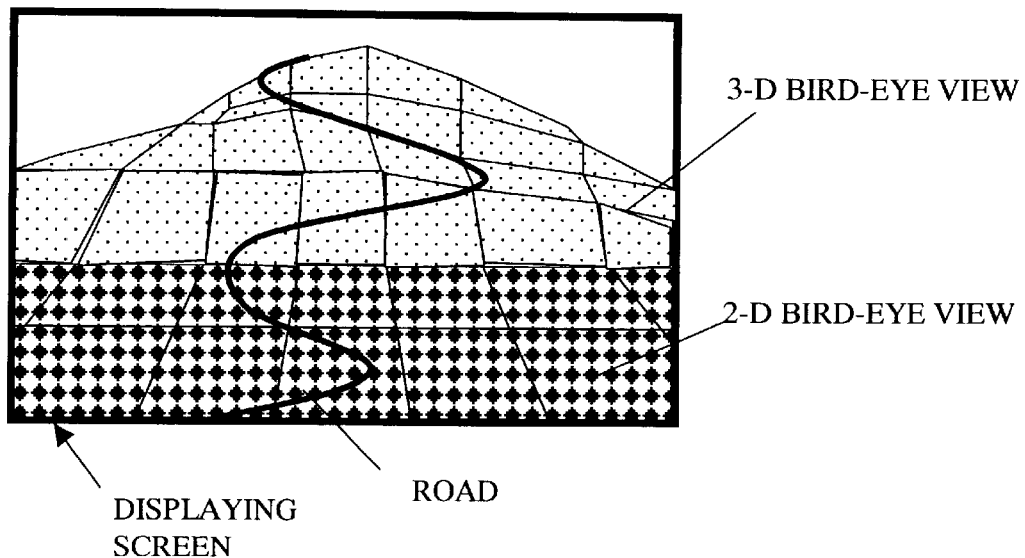
FIG. 4 is a diagram showing a monitor displayed by using the present invention.

According to the above procedure, in the mesh-landform shown in FIG. 3(a), for example, the relative altitude values become low because the reference altitude value is subtracted from each value both in the plane area A and in the solid area B, as shown in FIG. 3(b). Therefore, both the 2-dimensional bird-eye view and the 3-dimensional bird-eye view are displayed continuously (see FIG. 4).

In addition that the landform in the plane area is continuous with the landform in the solid area, a road spreading from the plane area to the solid area is also displayed as the road in the plane area is continuous with the road in the solid are.

In this embodiment, the mean value of the altitude data in the plane area A is defined as the reference altitude value, but it is needless to say that the mean value of the altitude data in the boundary area C between the plane area A and the solid area B may be defined as the reference altitude value. The boundary area C can be defined as follows; the area within the specific size from the boundary line α between the plane area A and the solid area B.

And the altitude data "98" in the solid area B should be changed to "–2" in the above description, but in case the changed altitude data is negative, the negative value may be changed to "0".

Moreover, though the procedure of preparing the 2-dimensional bird-eye view is the same as the conventional system (specially, regarding to the changing of all altitude data in the plane area A to 0), the procedure may change so as to prepare the 2-dimentinal bird-eye view after adding the reference altitude value to the plane area A. In other words, even if the step of changing a same value by adding the reference altitude value to the plane area A, instead of subtracting the reference altitude value from the altitude data in the solid area B, is performed, it is possible to obtain the same effect as above.

In addition, the altitude data changing means 7 may change the altitude values in the plane area to the reference altitude value. If the solid area includes an altitude value smaller than the reference altitude value, the altitude data changing means 7 may replace such an altitude value with the reference altitude value. The altitude data changing means 7 may also change the altitude values in the solid area, which is contiguous with the plane area, into the reference altitude value.

Figure 5:
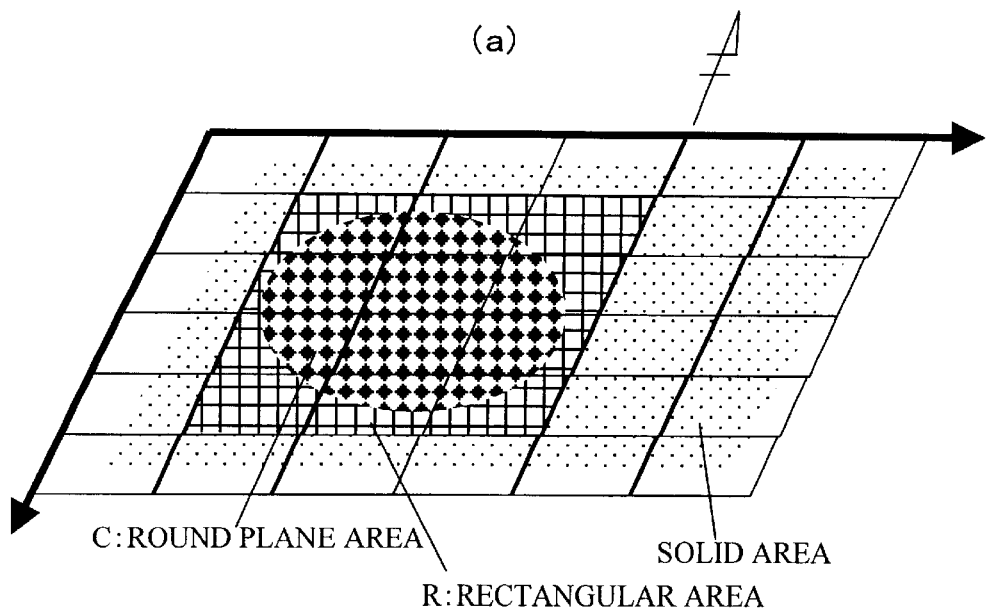
FIG. 5 is a diagram showing an example of the modified plane area.
Figure 5:
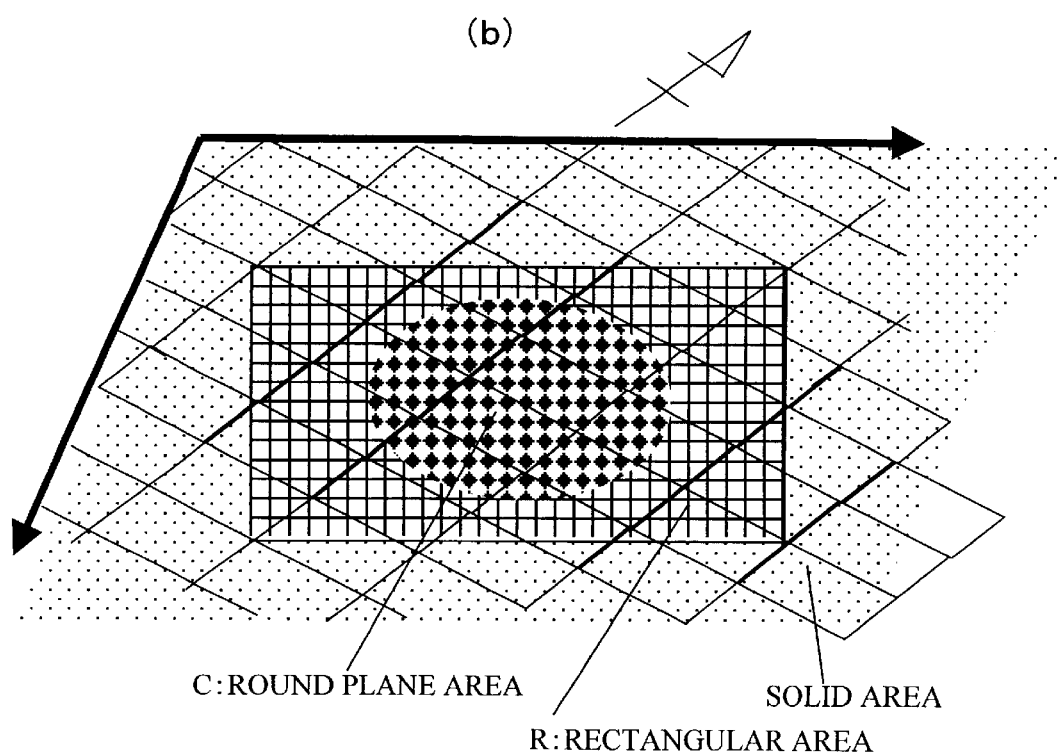

Further more, in this embodiment, the 2-dimensional bird-eye view is displayed on the lower side of the monitor while the 3-dimensional bird-eye view is displayed on the upper side of the monitor. A user, however, can change the area displayed as those bird-eye views on the monitor, by using the operating means 10. That is to say, the specific area (within a radius of 100 m, for example) from the user's standing position can be displayed as the 2-dimensional bird-eye view, and the area far away from the specific area can be displayed as the 3-dimensional bird-eye view. In this case, in order to improve the processing speed, the round plane area C shown in FIGS. 5(a) and 5(b) is preferred to be changed to a rectangular area R including the round plane area C. At this time, the rectangular area R has vertexes that are the crossings of the latitude and the longitude; as a result it is easy to extract location data. And even if the rectangular area R is not formed by lines parallel with the latitude and the longitude as shown in FIG. 5(a), it is enough that the rectangular area comprises only vertexes that are the crossings of the latitude and the longitude as shown in FIG. 5(b).

And it is needless to say that, instead of the navigation system, a system displaying the map data on the monitor can adopt the present invention.

In the above description, the 2-dimensional map data obtained from the 2-dimensional map data storage means 1 or the altitude data obtained from the landform data storage means 2 may be inputted to the reference altitude data determining means 6 and the altitude data changing means 7 passing through the communication. Thereby, since the system is to handle only the map data and the altitude data of the necessary area, the configuration of the system can be simplified. In addition, the system utilizes the 2-dimensional road data or the altitude data, which are transferred with communication.

[Embodiment 2]

Figure 7:
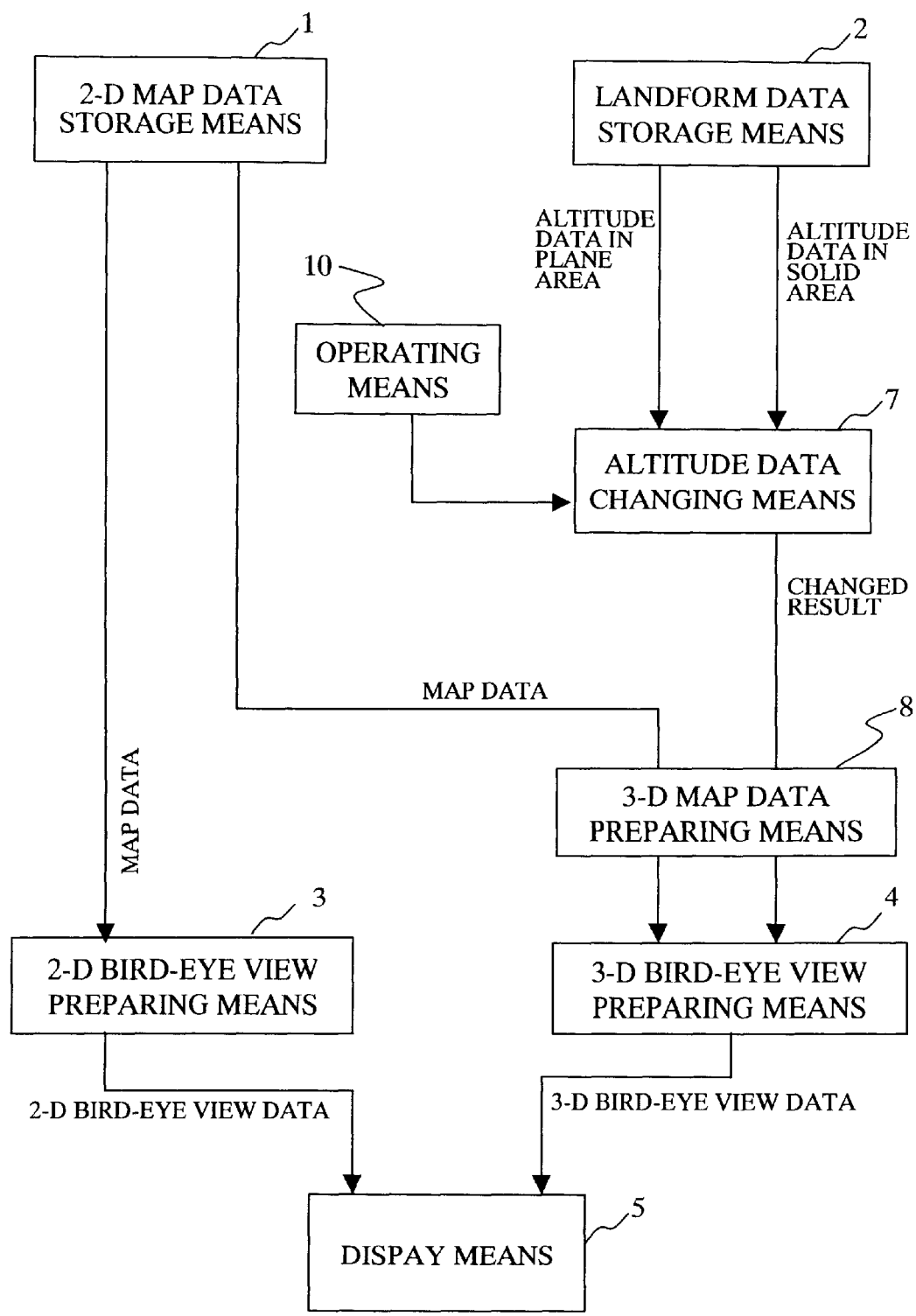
FIG. 7 is a block diagram showing the configuration of the second embodiment.

FIG. 7 is a block diagram showing the configuration of the second embodiment of the invention.

Figure 6:
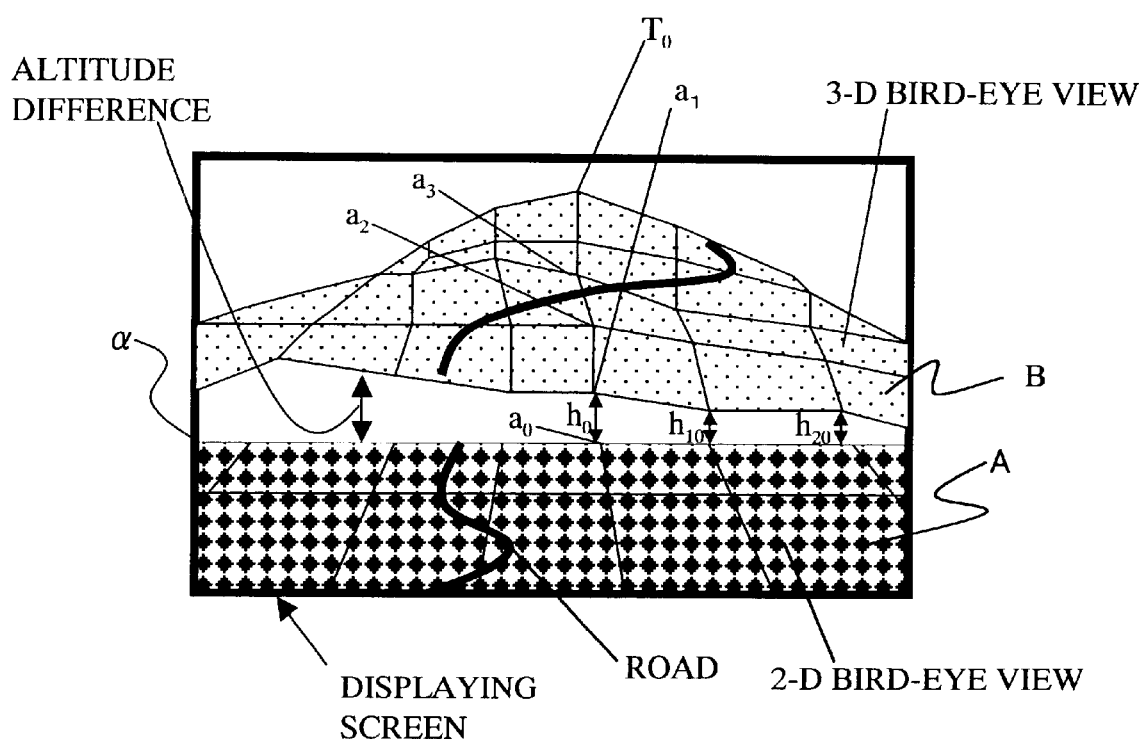
FIG. 6 is an explanatory diagram of the second embodiment.

One of the methods to bring the continuity to the plane area A and the solid area B, as shown in FIG. 6, is to move the points in the solid area downward on the monitor. For instance, in order to even the altitude difference between the point $a_0$ in the plane area A and the point $a_1$ in the solid area B, the point $a_1$ is pulled down toward the point $a_0$, and both points are placed on the point $a_0$. The point $a_2$ that is located at the corner of the next mesh on the side away from the boundary, and the next point $a_3$ . . . are to be moved up and down on the monitor in the specific ratio to the moving amount of the point $a_1$. The moving ratio of each point may be reduced as the point goes distant from the boundary. Therefore, without changing the altitude value of the top $T_0$, it is possible to bring the continuity to the plane area A and the solid area B.

The prescribed processing can be carried out by the altitude data changing means 70 as shown in FIG. 6. First, the altitude data changing means 70, after fetching the altitude data in the solid area B from the landform data storage means 2, changes the altitude values in the plane area to 0 like the altitude data changing means 7. Next, the altitude data changing means 70 detects the altitude difference $h_0$ between the point $a_0$ in the plane area A and the point $a_1$ in the solid area B. And the calculation processing is performed on the altitude value of each interpolated point, said value corrected based on the altitude difference $h_0$, on the side remote from the boundary (which is represented by a corner of the mesh-landform). Furthermore, the processing between the points $a_{10}$ and $a_{11}$, the points $a_{20}$ and $a_{21}$, . . . , those are located at every specific distance in the direction of the boundary line α, is performed in the same way, and the values thus calculated are given to the 3-dimensional map data preparing means 8.

[Embodiment 3]

The third embodiment of the invention will be described hereafter referring to the drawings.

Figure 8:
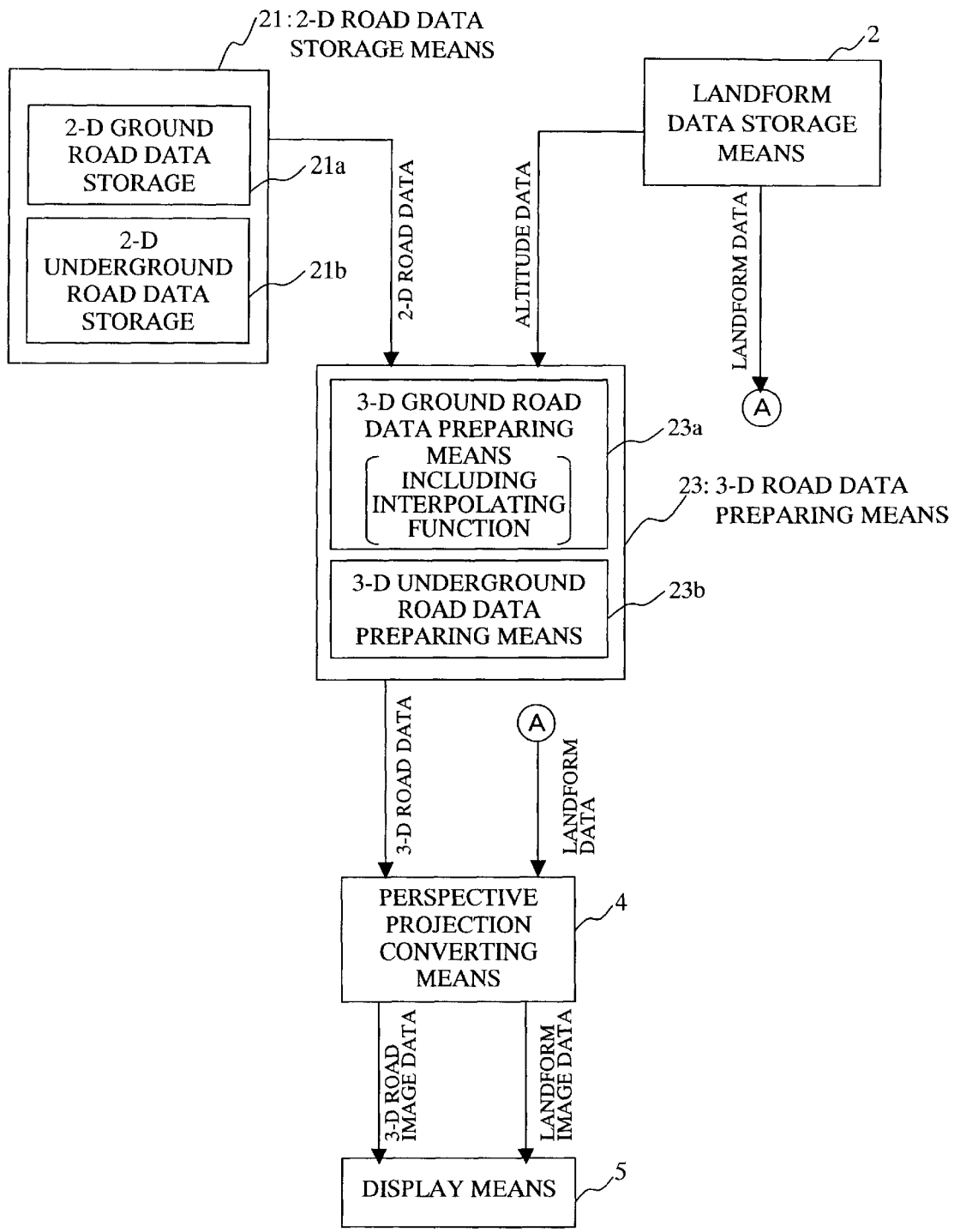
FIG. 8 is an explanatory diagram of the third embodiment.

FIG. 8 is a functional block diagram of the navigation system utilizing the present invention. The following configuration is described about the points different from the conventional system.

Figure 18:
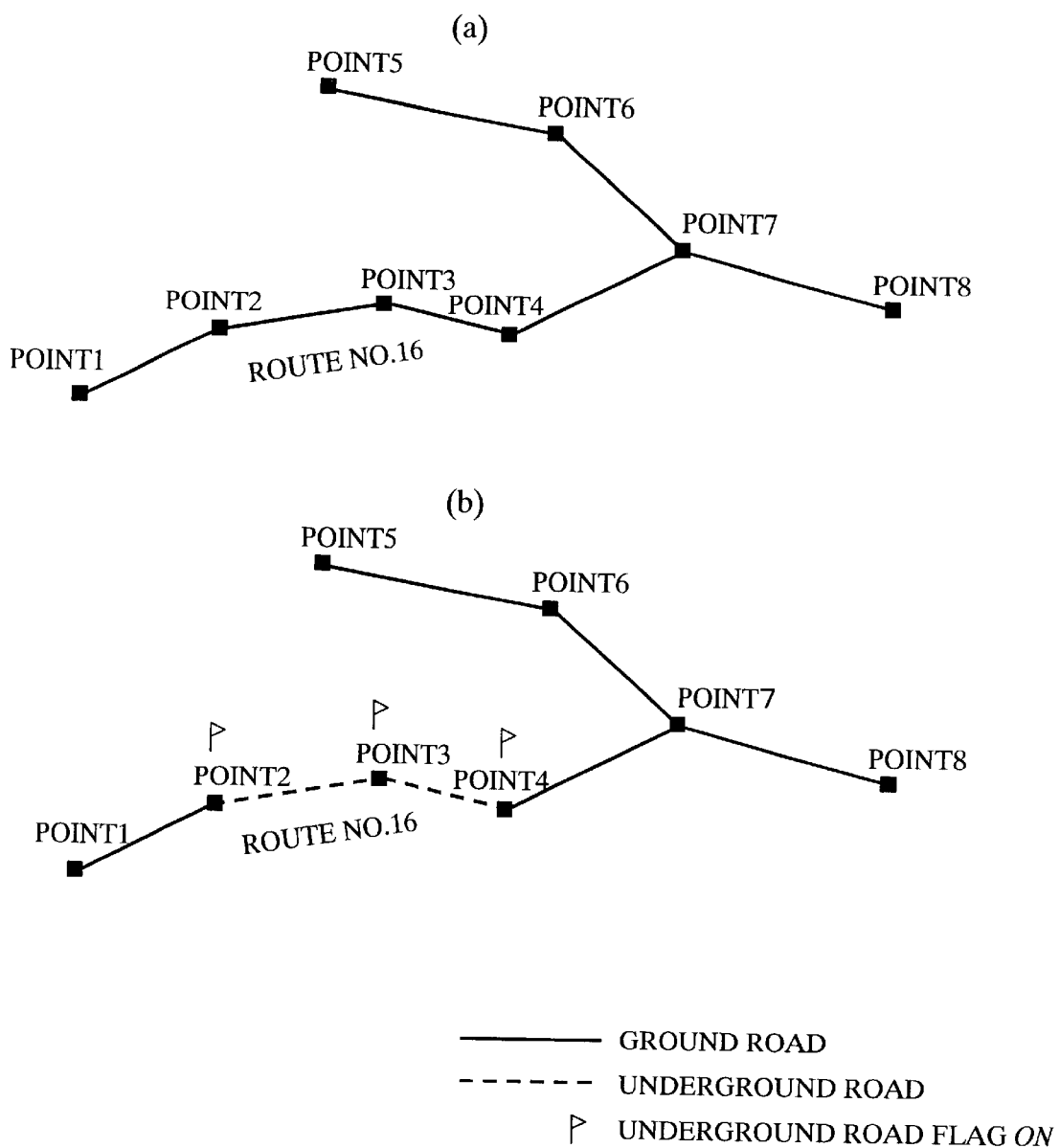
FIG. 18 is an explanatory diagram of the 2-dimensional road data.

First, the 2-dimentioanl road data storage means 21 is provided with the 2-dimentinal ground road data storage means 21a, and stores the 2-dimensional ground road data composed by the road component points, as shown in FIG. 18. When the contents of this embodiment are carried out at the same time of the first embodiment shown in FIG. 1, the 2-dimensional road data storage means 21 may be the same one as the 2-dimensional map data storage means 1.

Meanwhile, the landform data storage means 2 stores the landform data (the mesh-landform) added with the altitude value of a crossing of the latitude and the longitude as described above.

And the present system is also provided with the 3-dimensional ground road data preparing means 23a for preparing the 3-dimentinal ground road data based on the 2-dimensional ground road data, and said means prepares the 3-dimensional ground road data as follows.

Figure 11:
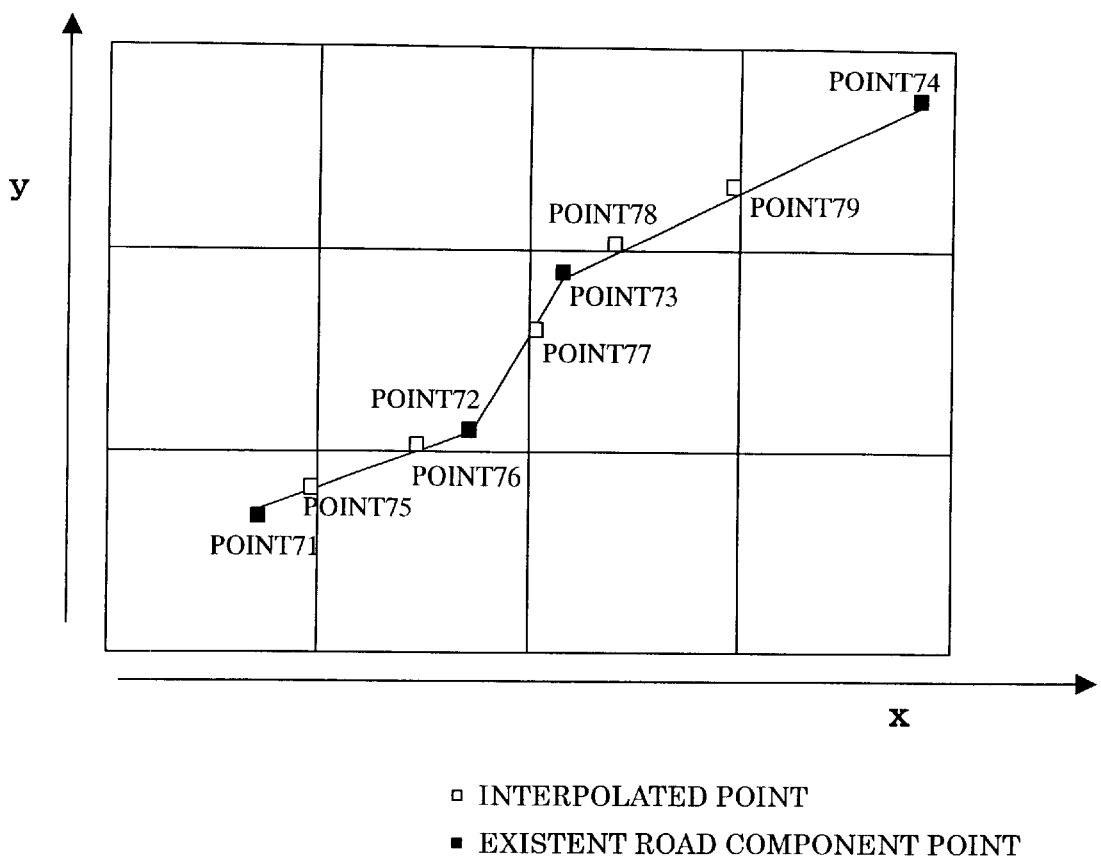
FIG. 11 is an explanatory diagram of the interpolation.
Figure 19:
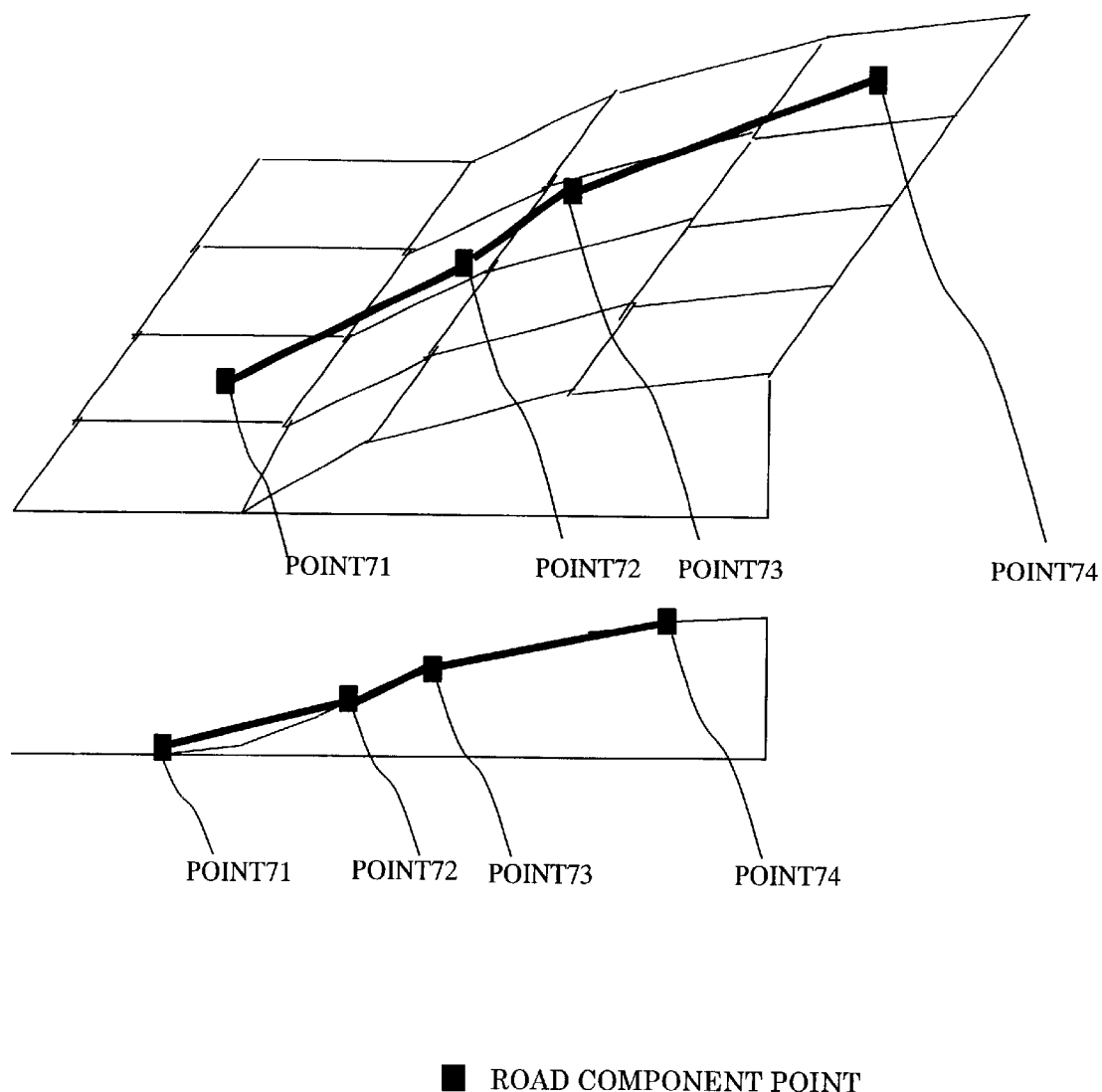
FIG. 19 is a diagram showing a road in the solid area illustrated by the conventional system.

As shown in FIG. 11 or FIG. 19, when the 2-dimensional road data in the displayed area on the monitor are the road component points 71, 72, 73, and 74 (those points are represented by black squares), even if those road component points are connected each other by a straight line, the ground road cannot be described along the undulation of the mesh-landform.

Figure 12:
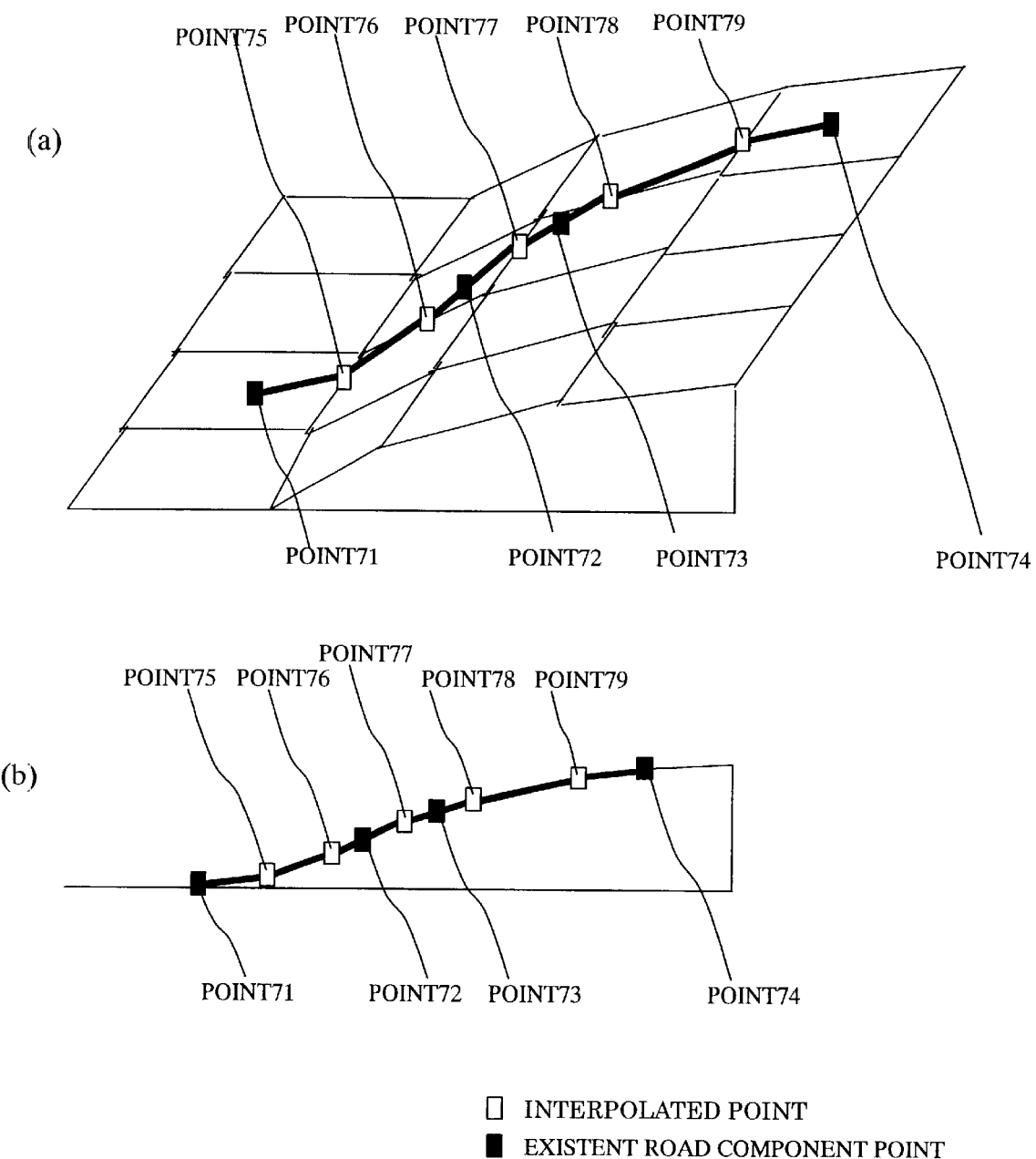
FIG. 12 is a diagram showing the road illustrated by the present invention.
Figure 13:
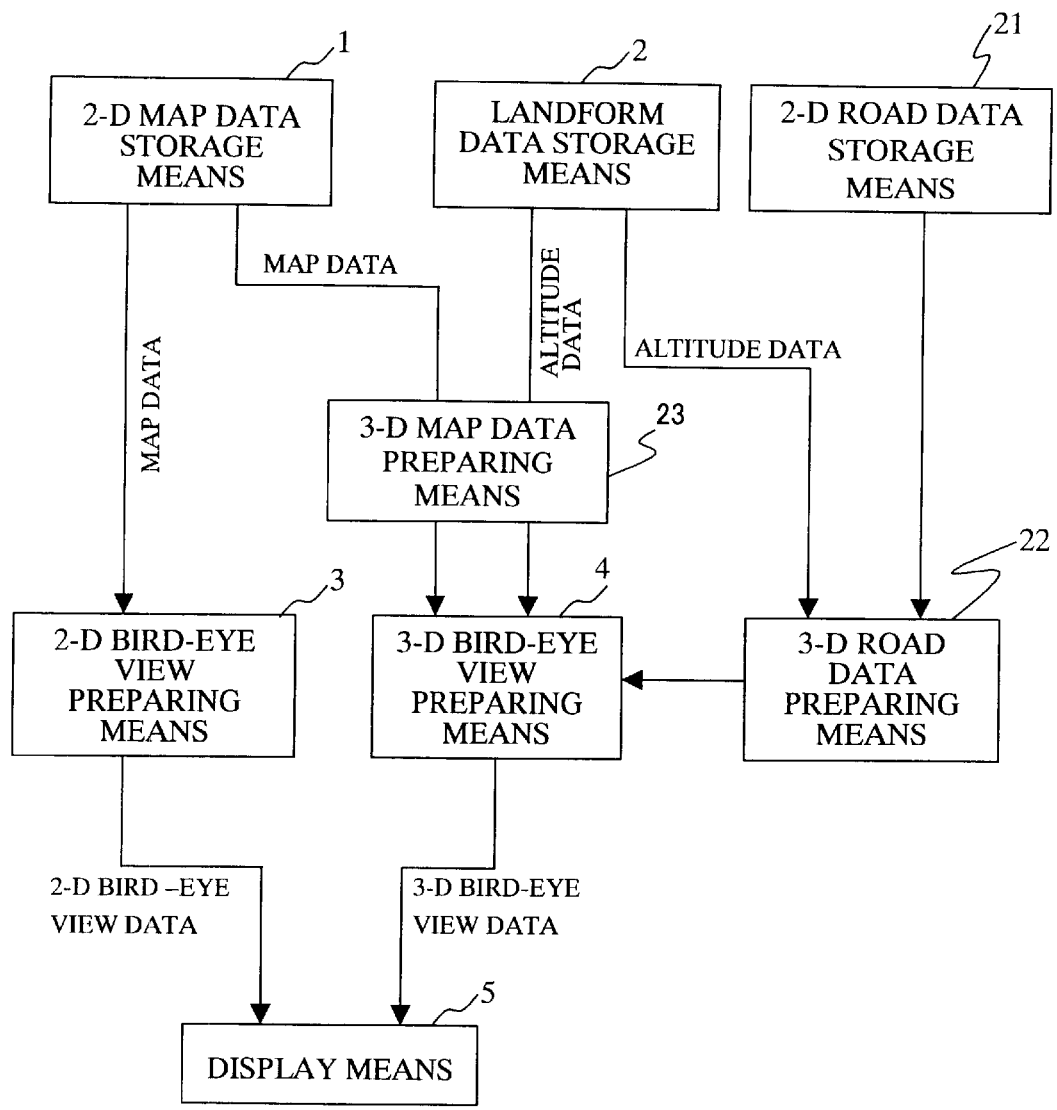
FIG. 13 is a block diagram showing the conventional system.
Figure 14:
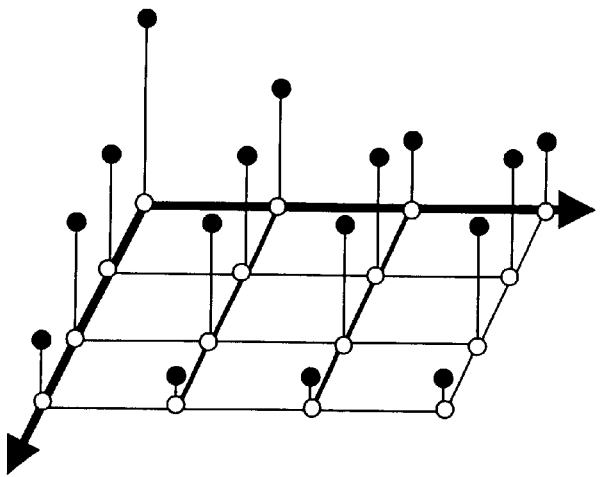
FIG. 14 is an explanatory diagram of the landform data (the altitude data).
Figure 15:
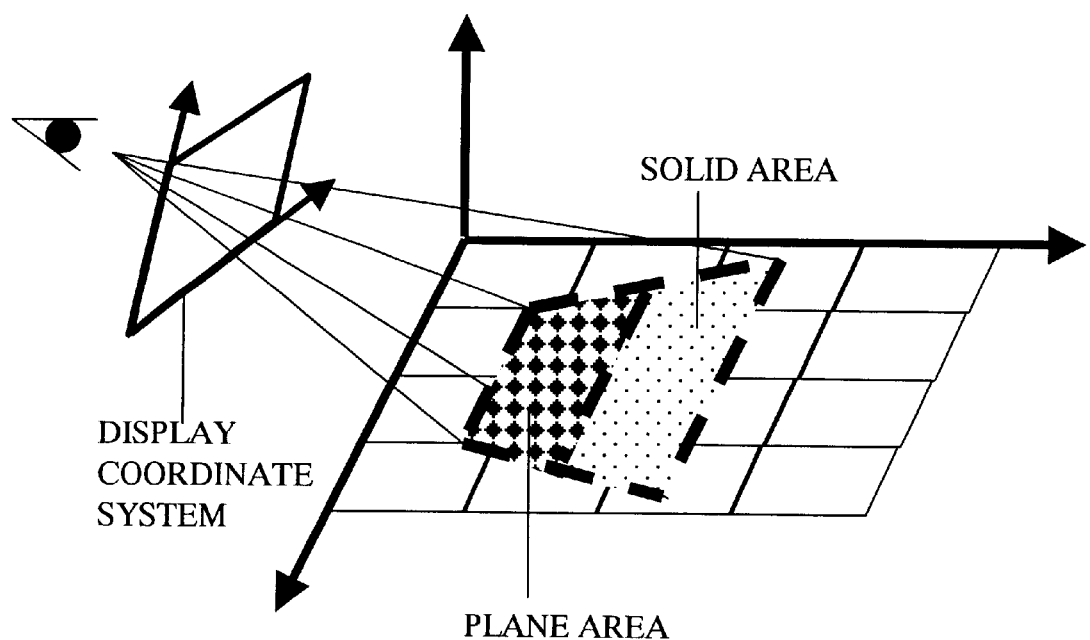
FIG. 15 is an explanatory diagram of the perspective projection converting processing.
Figure 16:
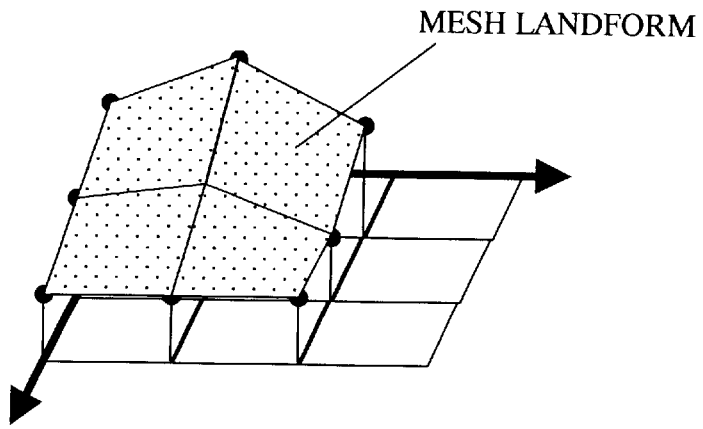
FIG. 16 is a conceptual diagram of the view of the mesh landform.
Figure 17:
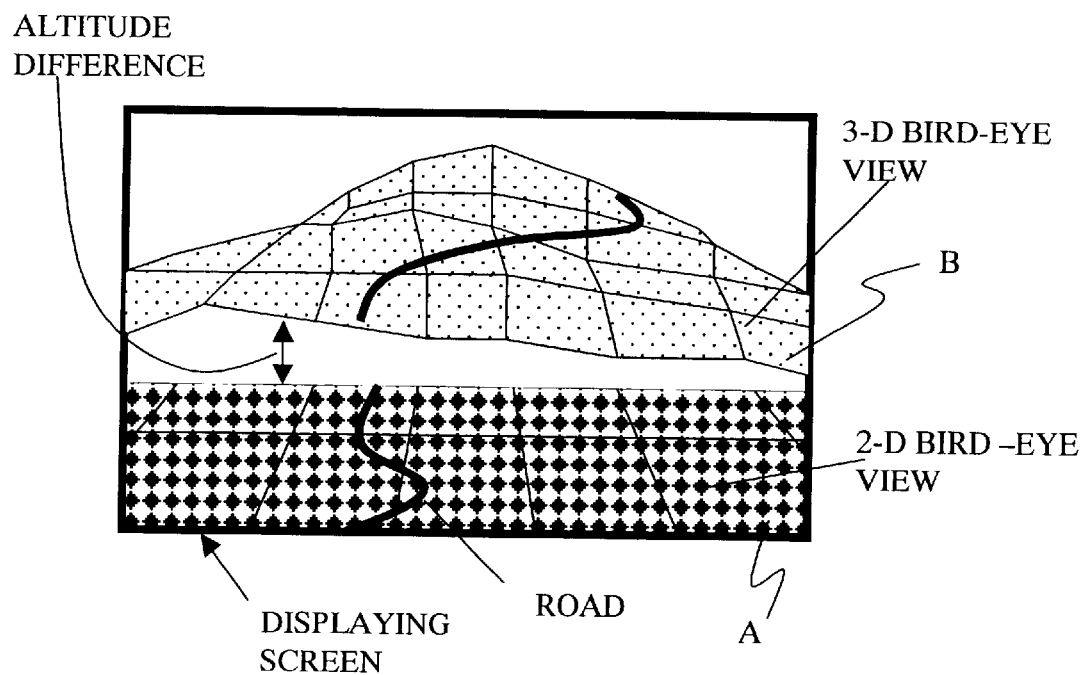
FIG. 17 is a diagram showing a monitor displayed by using the conventional system.

Therefore, the 3-dimensional ground road data preparing means 23a connects the road component points 71, 72, 73 and 74 each other with a straight line, and the crossing points 75, 76, 77, 78 and 79 (those points are represented by white squares) of the straight line and the mesh-boundary line are interpolated as the road component points, as shown in FIG. 15. According to such configuration, it is possible to carry out describing the ground road along the undulation of the mesh-landform, as shown in FIG. 12.

In this embodiment, since the landform data presupposes the mesh-landform, the interpolation is performed on the boundary line of the mesh, but the points to be interpolated may be determined according to the type of the landform data.

When roads could be illustrated along the landform of the ground surface as described above, as a result of connecting road component points of the 2-dimensional ground road data with each other, the underground roads like a tunnel would appear on the ground surface.

Therefore, the 2-dimensional road data to be stored in the 2-dimensional road data storage means 21 may be provided with an "underground road flag" represented by ON/OFF indicating whether the road component point is located under the ground surface or not. For instance, if the point 2 (100, –100) connected to the point 3 is located under the ground surface, said point composing the ROUTE 16, the point 2 is represented by the 2-dimensional underground road data such as (2, 100, –100, ROUTE 16, 3, ON).

When the 2-dimensional road data storage means 21 can store the ground road data and the underground road separately, it may be configured that the 2-dimensional road data is not provided with the underground road flag. In other words, when it is configured that the 2-dimensional road data storage means 21 comprises both the 2-dimensional ground road data storage means 21a for storing the 2-dimensional ground road data and the 2-dimensional underground road data storage means 21b for storing the 2-dimensional underground road data, the 2-dimensional road data may not be provided with the underground road flag.

Moreover, the 3-dimensional road data preparing means 23 is configured to comprise the 3-dimensional underground road data preparing means 23b. The working of the 3-dimensional underground road data preparing means 23b will be explained hereafter.

Figure 9:
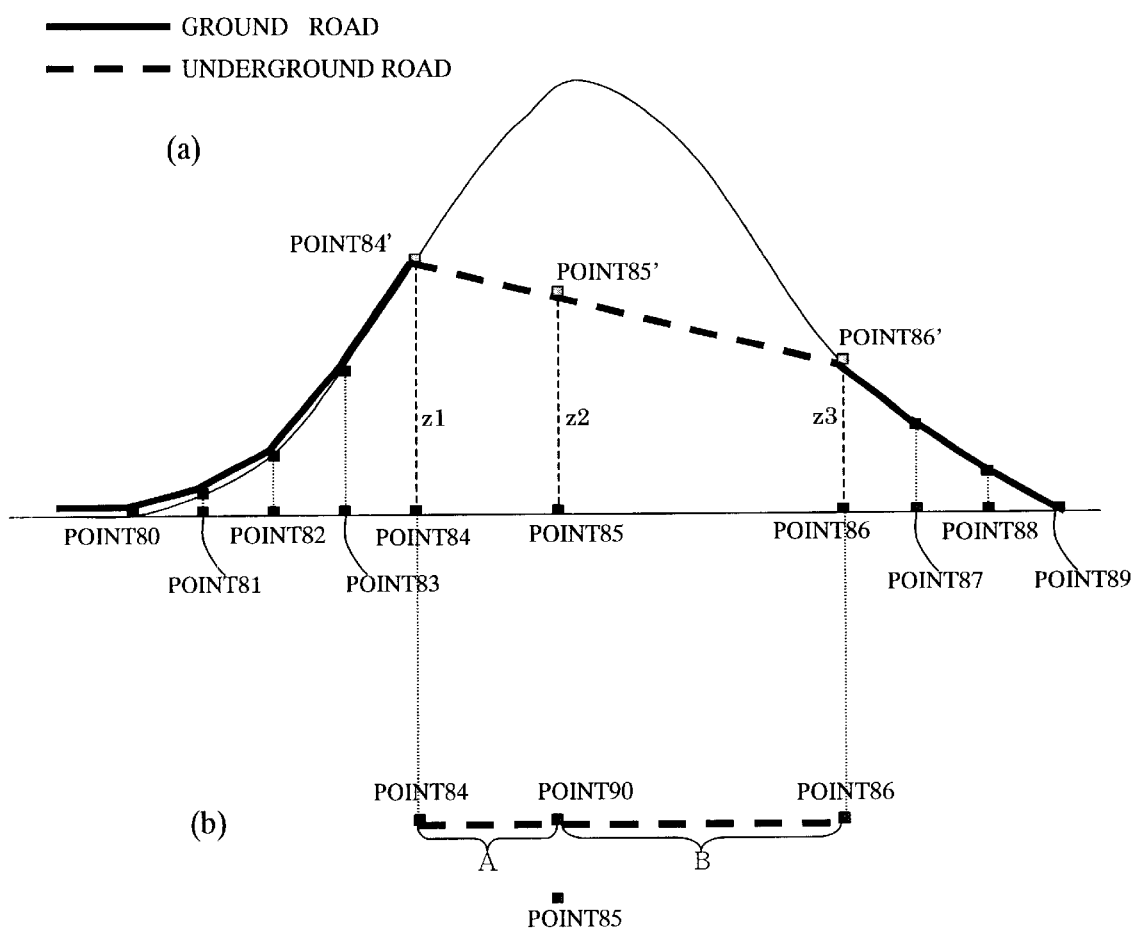
FIG. 9 is a diagram showing the procedure of preparing the 3-dimensional ground road data (when both the start point and the end point have been known).

FIG. 9(a) is a yz-plane view of the 3-dimensional space constructed on three axes of a x-axis, a y-axis and a z-axis, that is a perspective from the x-axis direction. It shows that the 2-dimensional road data (road components points) in the displayed area comprises road component points 80 to 83 and 87 to 89 of which underground road flags are OFF, and road component points 84 to 86 of which underground road flags are ON. At this time, 3-dimensional underground road data preparing means 23b adds the z-coordinate corresponding to the altitude value to the road component points 84(x1, y1), 85(x2, y2) and 86(x3, y3) respectively, and then acquires 3-dimensional road component points 84'(x1, y1, z1), 85'(x2, y2, z2), and 86'(x3, y3, z3). Connecting the 3-dimensional road component points 84' and 85', 85' and 86' by a straight line can prepare the 3-dimensional underground road data.

In this case, since the road component points 84 and 86 are a start point and an end point of the underground road and located on the ground surface, those altitude value z1 and z3 can be calculated according to the conventional method. But, the method for calculating the altitude value of the road component point 85 located under the ground is a new one, that is to say, since the landform data storage means 2 has stored a conventional landform data as above (the altitude value of the ground), the altitude data z2 of the road component point 85 located under the ground must be calculated based on the new method.

In this invention, when both the start point and the end point of the underground road have been already known (which will be described later), the altitude value of the road component points located under the ground should be calculated based on the line connecting the start point and the end point.

Specifically, the 3-dimensional underground road data preparing means 23b first seeks a straight line, represented by an equation 1, which connects the road component point 84(x1, y1) of the start point of the underground road and the road component point 86(x3, y3) of the end point of the underground road, and next seeks a point 90(x4, y4) that is located on the straight line and nearest to the road component point 85 (x2, y2). Moreover, in accordance with the point 90 (x4, y4) the calculation represented by an equation 2 is performed, as a result, this calculated result "Z" is defined as the altitude value z2 of the road component point 85 (in the equation 2, "A" shown in the equation 2 is defined as the distance from the road component points 84 to 90, and "B" is as the distance from road component points 86 to 90).

$$y = \frac{y3-y1}{x3-x1} \times x + y3 - \frac{y3-y1}{x3-x1} \times x3 \quad \text{(Equation 1)}$$

$$Z = \frac{A \times z3 + B \times z1}{A+B} \quad \text{(Equation 2)}$$

The value "Z" sought by the equation 2 indicates a point located on the straight line connecting the 3-dimensional road component points 84'(x1, y1, z1) and 86'(x3, y3, z3), and equivalent to the altitude value of the point having the same x-coordinate and y-coordinate as the point 90 (x4, y4). The altitude value z2 of the road component point 85 should be sought based on the above-mentioned calculations; this is because the road component point 85 is not always located on the straight line connecting the road component points 84 and 86, as shown in a xy-plane view in FIG. 9(b).

On the other hand, when either a start point or an end point of the underground road has been known (which will be described later), the altitude value of a road component point located under the ground may be calculated based on the altitude value of the ground corresponding to the road component point.

Figure 10:
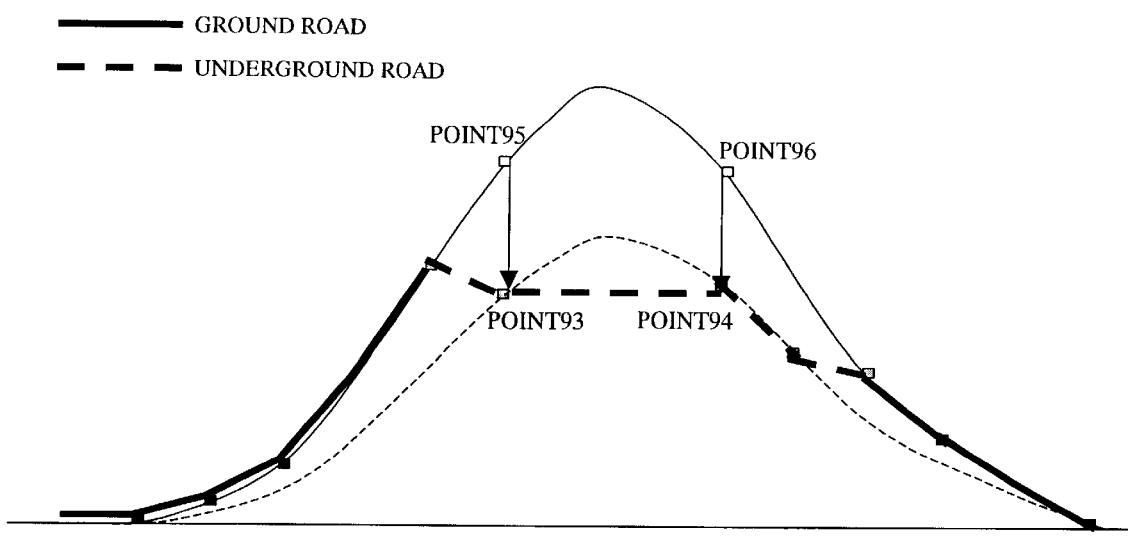
FIG. 10 is a diagram showing the procedure of preparing the 3-dimensional underground road data (when either the start point or the end point has been known).

For instance, the altitude values of the road component points 93 and 94 located under the ground are equal to a value that each altitude value of the points 95 and 96, those points having the same x-coordinate and y-coordinate of the points 93 and 94 respectively and located on the ground, is multiplied by a coefficient of reduction ("0.7" as shown in FIG. 10, for example).

Instead of multiplying each altitude value of the points 95 and 96 by the coefficient of reduction, a specific value may be subtracted from the points 95 and 96. That is to say, the method of calculating the altitude value of the road component point under the ground may adopt other methods if it is possible to acquire a value smaller than the altitude value of the ground corresponding to the road component point.

In the above description, in accordance of the information whether the start point and the end point of the underground road have been already known or not, the working is determined. The information means whether the start point and the end point are stored in the working memory (not shown) or not. That is to say, the 2-dimensional road data storage means 21 stores both the start point and the end point properly, but the 2-dimensional road data stored in the working memory of the 3-dimensional underground road data preparing means 23b are only data necessary for the displaying. Accordingly, there is a possibility that the working memory stores only one, either the start point or the end point. Even in this case, since it is necessary to prepare the underground road data without trouble, the working must be different as above.

As the invention is configured that the ground road data are distinguished from the underground data as above, it is possible to display not only the ground road data but also the underground road data. And it is configured to perform the interpolation on the mesh-formed boundary, so that the ground road data can be displayed along the undulation of the mesh-landform.

What is claimed is:

1. A map displaying system for displaying a map comprising a plane area having a 2-dimensional bird-eye view acquired by the perspective processing of map data represented by 2-dimensional coordinates, and a solid area having a 3-dimensional bird-eye view acquired by the perspective processing of 3-dimensional map data made by adding altitude values to respective points on a map represented by the 2-dimensional coordinates, comprising:
   reference altitude value determining means for determining a reference altitude value based on the altitude values in a specified zone; and
   altitude value changing means for bringing the continuity to the plane area and the solid area by changing the altitude values according to the reference altitude value.

2. A map displaying system according to claim 1, wherein the reference altitude value is calculated based on the altitude value in a specific zone of the plane area.

3. A map displaying system according to claim 2, wherein if the solid area includes an altitude value smaller than the reference altitude value, said altitude value changing means replaces such an altitude value with the reference altitude value.

4. A map displaying system according to claim 1, wherein the altitude value changing means changes the altitude value in the solid area to a value obtained by subtraction of the reference altitude value from the altitude value.

5. A map displaying system according to claim 4, wherein if a value obtained by subtraction of the reference altitude value from the altitude value in the solid area is negative, said altitude value changing means replaces said negative value with 0.

6. A map displaying system according to claim 4, which is further comprising operating means for inputting an instruction of modifying the plane area to a rectangular area having vertexes that are crossings of the latitude and the longitude per specific degree (distance).

7. A map displaying system according to claim 1, wherein the altitude value changing means changes the altitude values in the plane area to the reference altitude value.

8. A map displaying system according to claim 7, wherein the altitude value changing means changes the altitude values in the solid area, which is contiguous with the plane area, into the reference altitude value.

9. A map displaying system according to claim 1, wherein the altitude value changing means changes the altitude values in the solid area, which is contiguous to the plane area, into 0.

10. A map displaying system according to claim 1, wherein the reference altitude value determining means determines a mean value of the altitude values in the plane area as a reference altitude value.

11. A map displaying system according to claim 1, wherein the reference altitude value determining means determines a mean value of the altitude values in a boundary area between the plane area and the solid area as a reference altitude value.

12. A map displaying system according to claim 1, wherein the system utilizes the 2-dimensional road data or the altitude data which are transferred with communication.

13. A map data displaying system according to claim 1, wherein the road data continues from the plane area to the solid area.

14. A map displaying system for displaying a map comprising a plane area having a 2-dimensional bird-eye view acquired by the perspective processing of map data represented by 2-dimensional coordinates, and a solid area having a 3-dimensional bird-eye view acquired by the perspective processing of 3-dimensional map data made by adding altitude values to respective points on a map represented by the 2-dimensional coordinates, comprising:

altitude value changing means for bringing the continuity to the plane area and the solid area by interpolating gap formed in the boundary between the plane area and the solid area; and a display means for displaying the plane area and solid area based on the interpolation performed by the altitude data changing means.

15. A map displaying system according to claim 14, wherein the altitude value changing means makes an altitude value in the boundary compulsively equal to either an altitude value in the boundary of the plane area side or one in the boundary of the solid area side, said both side boundaries forming the gap, and smoothes those altitude values so as to diminish the moving volume from the original altitude value depending on distance from the boundary.

16. A map displaying method of displaying a map comprising a plane area having a 2-dimensional bird-eye view acquired by the perspective processing of map data represented by 2-dimensional coordinates, and a solid area having a 3-dimensional bird-eye view acquired by the perspective processing of 3-dimensional map data made by adding altitude values to respective points on a map represented by the 2-dimensional coordinates, comprising the steps of:

changing an altitude data for bringing the continuity to the plane area and the solid area by interpolating a gap formed in the boundary between the plane area and the solid area; and displaying the plane area and solid area based on the interpolation performed by the changing step.

17. A map displaying method for displaying a map comprising a plane area having a 2-dimensional bird-eye view acquired by the perspective processing of map data represented by 2-dimensional coordinates, and a solid area having a 3-dimensional bird-eye view acquired by the perspective processing of 3-dimensional map data made by adding altitude values to respective points on a map represented by the 2-dimensional coordinates, comprising the steps of:

determining an altitude value in a specified zone as a reference altitude value; and changing the altitude values according to the reference altitude value so as to bring the continuity to the plane area and the solid area.

18. A map displaying method according to claim 17, wherein the 2-dimensional road data or the altitude data are transferred with communication.

19. A map displaying system for displaying 3-dimensional road combined with a surrounding landform based on road data made by adding altitude values to respective road component points represented by 2-dimensional coordinates comprising:

3-dimensional road data preparing means for interpolating by adding an altitude value to a specific point on respective straight line connecting road component points; and a display means for displaying the 3-dimensional road based on the data prepared by the 3-dimensional road data preparing means together with the landform.

20. A map displaying system for displaying 3-dimensional road combined with a surrounding landform based on road data made by adding altitude values to 2-dimensional ground road data represented by road component points, comprising:

2-dimensional road data storage means for storing 2-dimensional ground road data and 2-dimensional underground road data; and 3-dimensional underground road data preparing means for preparing 3-dimensional ground road data based on the 2-dimensional ground road data and the altitude values, and preparing 3-dimensional underground road data based on the 2-dimensional underground road data and the altitude values.

21. A map displaying system according to claim 20, wherein the 3-dimensional underground road data preparing means calculates the altitude value of a road component point located under the ground in accordance with a straight line connecting a start point and an end point, if both the start point and the end point of the underground road are known.

22. A map displaying system according to claim 20, wherein the 3-dimensional underground road data preparing means calculates the altitude value of a road component point located under the ground in accordance with the altitude value of the ground corresponding to the road component point, if either the start point or the end point of the underground road is known.

23. A map displaying system according to claim 22, wherein the 3-dimensional underground road data preparing means calculates the altitude value of the road component points located under the ground by multiplying the ground altitude value by a specific value.

24. A map displaying system according claim 22, wherein the 3-dimensional underground road data preparing means calculates the altitude value of a road component point located under the ground by subtracting a specific value from the ground altitude value.

25. A map displaying method for displaying 3-dimensional road combined with a surrounding landform based on road data made by adding altitude values to respective road component points represented by 2-dimensional coordinates comprising the steps of:

interpolating by adding an altitude value to a specific point on respective straight line connecting road component points; and displaying the 3-dimensional road based on the data prepared by the interpolating step together with the landform.

26. A map displaying method for displaying 3-dimensional road combined with a surrounding landform based on road data made by adding altitude values to respective road component points represented by 2-dimensional coordinates, comprising the steps of:

storing in the 2-dimensional road data storage means 2-dimensional ground road data and 2-dimensional underground road data; and preparing 3-dimensional ground road data based on the 2-dimensional ground road data, and preparing 3-dimensional underground road data based on the 2-dimensional underground road data.

* * * * *